United States Patent
Frey

(10) Patent No.: US 10,534,619 B2
(45) Date of Patent: Jan. 14, 2020

(54) MEMORY MANAGEMENT SYSTEM WITH MULTIPLE BOOT DEVICES AND METHOD OF OPERATION THEREOF

(71) Applicant: SMART Modular Technologies, Inc., Newark, CA (US)

(72) Inventor: Robert T. Frey, Fremont, CA (US)

(73) Assignee: SMART Modular Technologies, Inc., Newark, CA (US)

(*) Notice: Subject to any disclaimer, the term of this patent is extended or adjusted under 35 U.S.C. 154(b) by 0 days.

(21) Appl. No.: 15/055,448

(22) Filed: Feb. 26, 2016

(65) Prior Publication Data
US 2017/0249156 A1  Aug. 31, 2017

(51) Int. Cl.
*G06F 9/4401* (2018.01)

(52) U.S. Cl.
CPC .................. *G06F 9/441* (2013.01)

(58) Field of Classification Search
CPC .............. G06F 11/0757; G06F 9/441
See application file for complete search history.

(56) References Cited

U.S. PATENT DOCUMENTS

| | | | |
|---|---|---|---|
| 5,666,538 A * | 9/1997 | DeNicola | G06F 1/3221 709/217 |
| 7,716,411 B2 | 5/2010 | Panabaker et al. | |
| 8,560,761 B2 | 10/2013 | Tzeng | |
| 8,612,676 B2 | 12/2013 | Dahlen et al. | |
| 8,738,840 B2 | 5/2014 | Tzeng | |
| 2004/0190210 A1 | 9/2004 | Leete | |
| 2009/0089514 A1* | 4/2009 | Srivastava | G06F 1/30 711/154 |
| 2011/0161686 A1* | 6/2011 | Kumagaya | G06F 1/26 713/300 |
| 2014/0181492 A1* | 6/2014 | Chen | G06F 9/4401 713/2 |
| 2014/0201432 A1 | 7/2014 | Nemazie et al. | |
| 2014/0229661 A1 | 8/2014 | Tzeng | |
| 2016/0011887 A1* | 1/2016 | Chung | G06F 9/4416 713/2 |

OTHER PUBLICATIONS

Sean Gallagher, Memory that never forgets: non-volatile DIMMs hit the market, 2013, ars technica (Year: 2013).*

* cited by examiner

*Primary Examiner* — Austin Hicks
(74) *Attorney, Agent, or Firm* — Wong & Rees LLP

(57) ABSTRACT

A memory management system, and method of operation thereof, includes: a primary device of a resilient storage module configured as a boot device for booting a computer system; an operational status received from the computer system; a secondary device of the resilient storage module configured as the boot device based on the operational status indicating a non-operational state; and a memory module controller of the resilient storage module for initiating a reboot operation using the secondary device as the boot device.

20 Claims, 3 Drawing Sheets

MEMORY MANAGEMENT SYSTEM WITH MULTIPLE BOOT DEVICES AND METHOD OF OPERATION THEREOF

TECHNICAL FIELD

The present invention relates generally to a memory management system, and more particularly to a system with multiple boot devices.

BACKGROUND ART

There is a continual need in the area of electronics and electronic computing systems toward smaller systems and/or systems with greater computing performance for a given space and within a given power profile. Within these systems, the integrated circuit and memory modules are the building block used in high performance electronic systems to provide applications for usage in products such as computers, cell phone, intelligent portable military devices, aeronautical spacecraft payloads, automobiles, image systems, and a vast line of other similar products that require small compact electronics supporting many complex functions.

Products must compete in world markets and attract many consumers or buyers in order to be successful. It is very important for products to continue to improve in features, performance, and reliability while reducing product costs, product size, and to be available quickly for purchase by the consumers or buyers. Manufacturing improvements may increase reliability of a product itself, but there are situations out of the manufacturer's control which also may impact the user experience, such as extreme temperatures and pressures, simple user error, and unreliable power supply.

Thus, a need still remains for a system to reliably detect failure conditions and reboot a computer system in the case of system power loss, system crash, or other system error. In view of the growing importance of data and data structures, it is increasingly critical that answers be found to these problems in order to ensure that user data is not lost. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a memory management system with multiple boot drive system that includes: configuring a primary device of a resilient storage module as a boot device for booting a computer system; detecting an operational status of the computer system; reconfiguring a secondary device of the resilient storage module as the boot device based on the operational status indicating a non-operational state; and initiating a reboot operation using the secondary device as the boot device for the computer system.

The present invention provides a memory management system with multiple boot drive system that includes: a primary device of a resilient storage module configured as a boot device for booting a computer system; an operational status received from the computer system; a secondary device of the resilient storage module configured as the boot device based on the operational status indicating a non-operational state; and a memory module controller of the resilient storage module for initiating a reboot operation using the secondary device as the boot device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
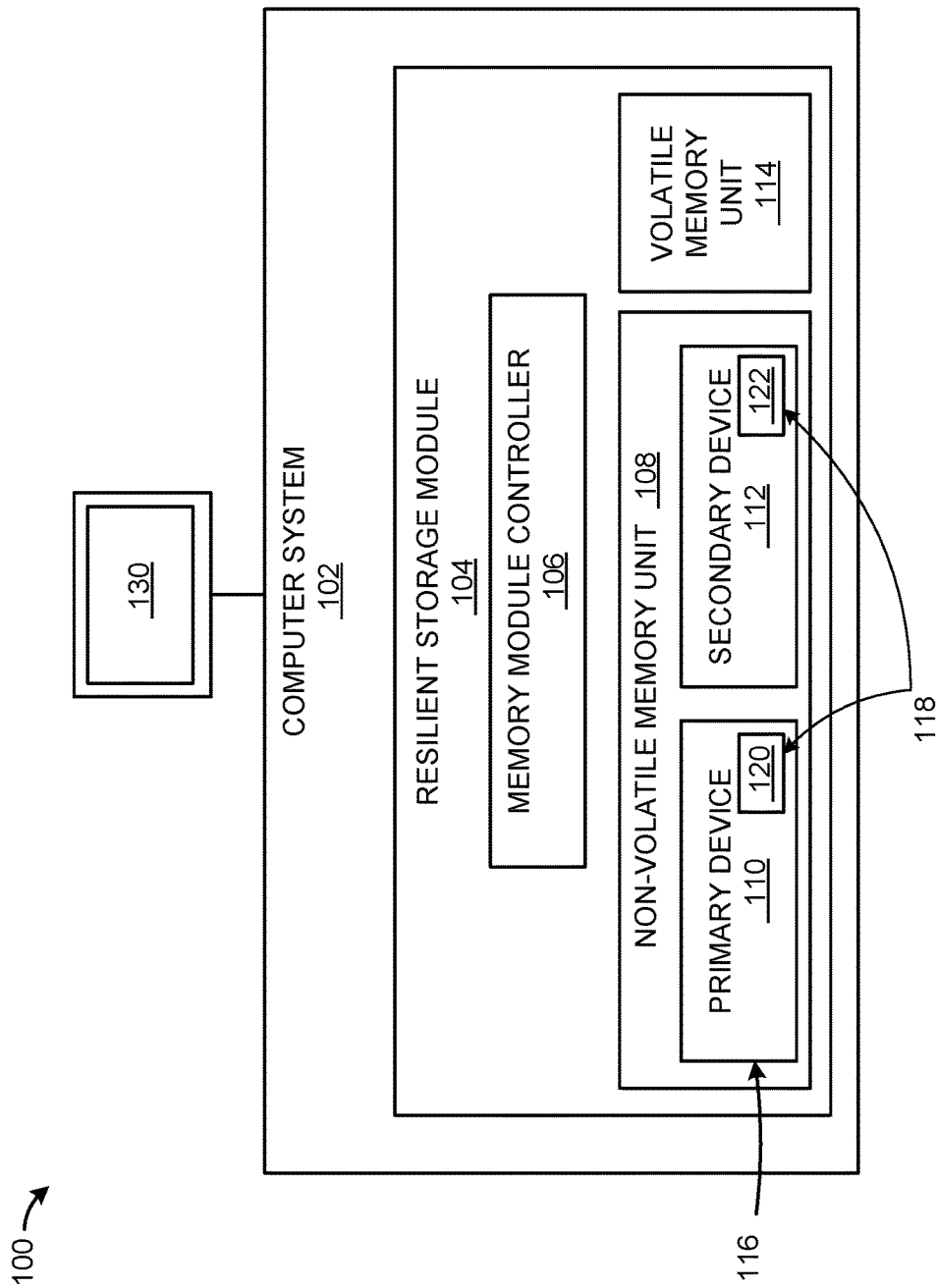
FIG. 1 is a functional block diagram of a memory management system with multiple boot drives in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

Referring now to FIG. 1, therein is shown a functional block diagram of a memory management system 100 with multiple boot devices in an embodiment of the present invention. A computer system 102 can reboot reliably using a resilient storage module 104.

The computer system 102 is a reliable computing platform. The computer system 102 can have a variety of configurations. For example, the computer system 102 can be a kiosk, an entertainment system, an advertising system, a security system, a sales system, a headless system, or a combination thereof. After the computer system 102 boots, the system can automatically begin running the target application suite to perform the desired functionality of the computer system 102. In an illustrative example, the computer system 102 can be configured as an advertising kiosk system and display information on a display unit 130.

The resilient storage module 104 is a memory component having a non-volatile memory unit 108 and a volatile memory unit 114. The resilient storage module 104 can provide operational memory for the computer system 102 in the volatile memory unit 114 as well as one or more solid state drives in the non-volatile memory unit 108. The non-volatile memory unit 108 can provide permanent storage space for programs, information, files, images, video, or other data elements.

The resilient storage module 104 can have a variety of configurations. For example, the resilient storage module 104 can be a dual in-line memory module (DIMM), single in-line memory module (SIMM), next generation form factor memory module (M.2), or a similar memory device form factor.

The non-volatile memory unit 108 is a memory storage device that can retain information when the power is unavailable. The non-volatile memory unit 108 can have a variety of configuration. For example, the non-volatile memory unit 108 can be a NAND Flash memory, NOR-Flash memory, a magneto-resistive memory, a charge coupled device, disk drive, or a combination thereof.

The non-volatile memory unit 108 can be configured to be one or more solid state drives, such as a primary device 110, a secondary device 112, or additional other storage devices. The primary device 110, the secondary device 112, or the other solid state storage devices can act as a boot device 116. The boot device 116 is a storage device configured to boot a computer into a particular operating system. Although the non-volatile memory unit 108 is described as having two storage devices, it is understood that the non-volatile memory unit 108 can be configured to have any number of solid-state storage devices, each of which can be configured as the boot device 116.

The volatile memory unit 114 is a random access, byte oriented memory device for providing operational memory for executing programs in the computer system 102. The volatile memory unit 114 can be the main memory of the computer system 102. The volatile memory unit 114 can have a variety of configurations. For example, the volatile memory unit 114 can be dynamic random access memory (DRAM), synchronous dynamic random access memory (SDRAM), Double Data Rate Synchronous Random Access Memory (DDR SDRAM); static random access memory (SRAM), or similar dynamic memory types.

The resilient storage module 104 can provide both a byte-oriented random access memory and a block-oriented solid state disk device in a single package with a small form factor. The resilient storage module 104 can be installed within a small computer system to provide both memory and storage functions in a single package.

It has been discovered that providing both the volatile memory unit 114 and the non-volatile memory unit 108 can improve flexibility of form factor by providing both functionalities in a single component. Combining the volatile memory unit 114 and the volatile memory unit 114 reduces the number of components needed for system operation and enables more compact packaging and form factors.

The resilient storage module 104 can include a memory module controller 106 for operating and configuring the resilient storage module 104. The memory module controller 106 can control the configuration of the non-volatile memory unit 108, such as the size and number of the solid state drives.

The memory module controller 106 can configure the primary device 110 and the secondary device 112 as the boot device 116. For example, the non-volatile memory unit 108 can be partitioned as two devices such as the primary device 110 and the secondary device 112. Each of the devices can be have a boot image file 118, such as a first boot image 120 or a second boot image 122. The memory module controller 106 can configured the devices such that the primary device 110 is used to boot the computer system 102 when a reboot is needed. If the primary device 110 is not suitable for booting for any reason, the memory module controller 106 can configured the computer system 102 to reboot using the secondary device 112 as the boot device.

At boot time, the computer system 102 can load the first boot image 120 from the boot device 116 and load the bootable executable image in to the volatile memory unit 114. The boot executable image can then boot the computer system 102 with the current operation system and target application suite.

The computer system 102 can be configured to use the primary device 110 as a mass storage device for system operation as well as for booting. For example, the primary device 110 can be the bootable disk for the computer system 102.

Because the primary device 110 can experience system wear, such as when a Flash memory drive gradually develops device errors over time, the primary device 110 can reach a state when there first boot image 120 is so damaged that the computer system 102 cannot be rebooted using the first boot image 120. When the computer system 102 cannot be booted using the primary device 110, the memory module controller 106 can detect the boot failure and reconfigure the non-volatile memory unit 108 to make the secondary device 112 the boot device 116. The secondary device 112 can be configured with the second boot image 122 for the computer system 102 and then the computer system 102 can be rebooted using the secondary device 112. Using the secondary device 112 as the boot device 116 can provide an enhanced level of fault tolerance to increase reliability of the computer system 102.

The secondary device 112 can include a separate version of the first boot image 120 and a separate target application suite. When the computer system 102 reboots using the secondary device 112, the computer system 102 can have the configuration provided by the bootable image of the secondary device 112.

It has been discovered that providing the computer system 102 with the secondary device 112 configured as the boot device 116 increases the reliability of the computer system 102. By booting from the secondary device 112 when there is a failure in the primary device 110, the computer system 102 can remain operational for a longer period of time.

It has been discovered that allowing the memory module controller 106 to change the boot device 116 when a failure is detected increases reliability and improves the technical functionality of the computer system 102. Dynamically changing the boot device 116 after detecting a failure in operation of the computer system 102 increases the amount of time the computer system 102 can remain operational without external support and manual intervention.

Figure 2:
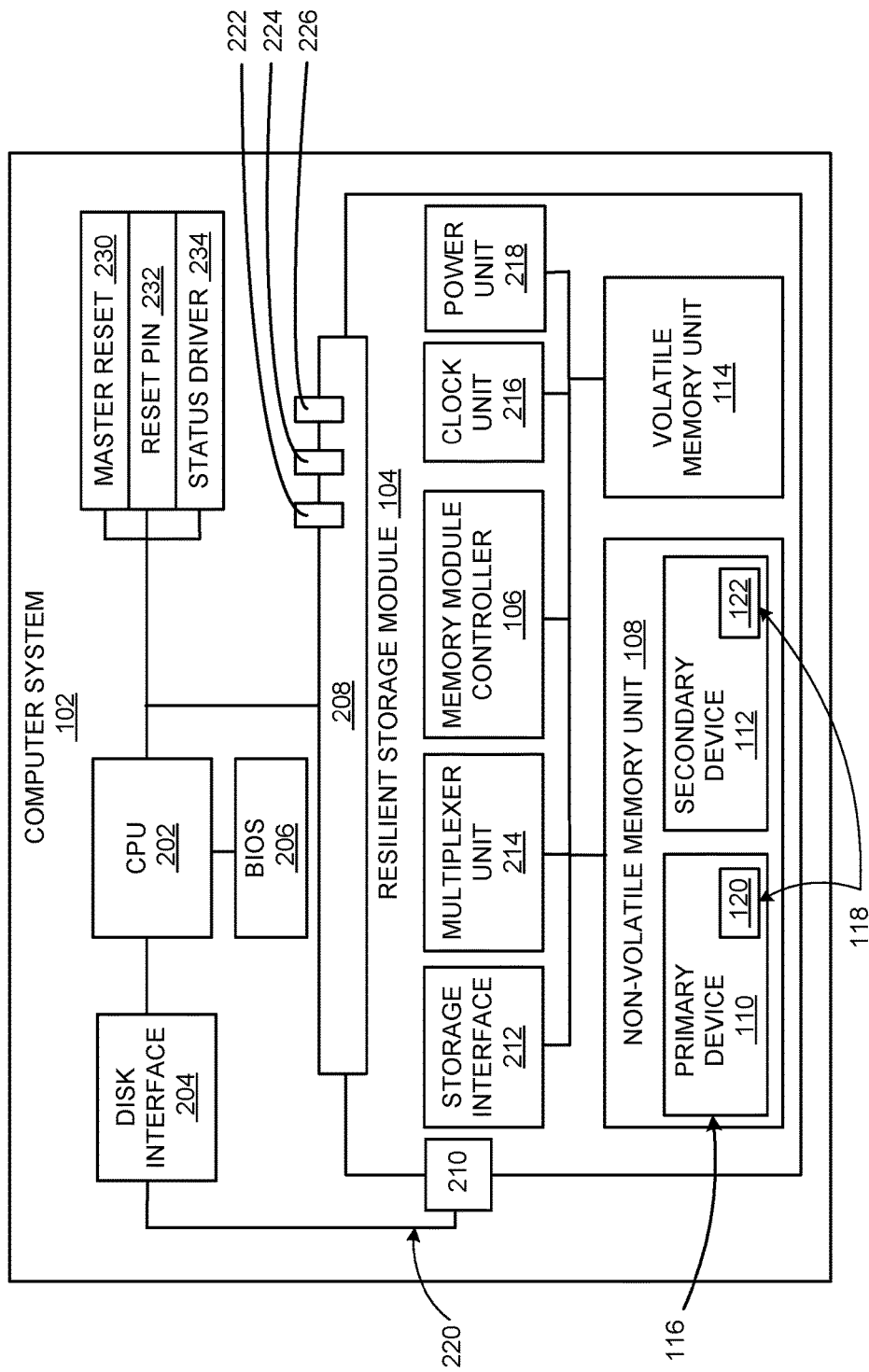
FIG. 2 is a second embodiment of the memory management system.

Referring now to FIG. 2, therein is shown a second embodiment of the memory management system 100 of FIG. 1. The computer system 102 can include the resilient storage module having the primary device 110 and the secondary device 112.

The computer system 102 can be a general purpose computing system having a central processing unit 202 (CPU), a basic input/output system 206 (BIOS), a disk interface 204, and the resilient storage module 104 coupled to the CPU 202 through a memory bus 208. The memory bus 208 can include a memory bus connector, such as a DIMM memory connector.

The BIOS 206 is a firmware program to control the basic operations of the computer system 102. The BIOS 206 can automatically run on the CPU 202 when the computer system 102 is activated. The BIOS 206 can initiate the process of booting up the computer system 102 by loading the boot image file 118, such as the first boot image 120 from the boot device 116, into the memory of the computer system 102 and executing the first boot image 120. Alternatively, if the secondary device is configured as the boot device 116, then the second boot image 122 can be used.

The boot device 116 can be coupled to the CPU 202 through the disk interface 204. The disk interface 204 can have a variety of configuration. For example, the disk interface 204 can include a serial advanced technology attachment (SATA) interface, a parallel advanced technology attachment (PATA), an integrated development environment interface (IDE), small computer system interface (SCSI), a universal serial bus interface (USB), a serially attached SCSI interface (SAS), or other similar storage interfaces.

The computer system 102 can include the resilient storage module 104 attached via the memory bus 208. The resilient storage module 104 can include the memory module controller 106 coupled to the volatile memory unit 114 and the non-volatile memory unit 108 having the primary device 110 and the secondary device 112.

The volatile memory unit 114 can provide operational memory for the computer system 102. The non-volatile memory unit 108 can provide long term storage for the computer system. The primary device 110 and the secondary device 112 can be bootable storage volumes for operating the computer system 102.

The resilient storage module 104 can have a variety of configurations. For example, the resilient storage module 104 can include a storage connector 210, a storage interface 212, a multiplexer unit 214, a clock unit 216, and a power unit 218.

The resilient storage module 104 can couple the primary device 110 and the secondary device 112 to the disk interface 204 of the computer system 102 via the storage connector 210, and the storage interface 212, and the multiplexer unit 214.

The storage connector 210 is an attachment point for a storage cable 220 to be coupled between the resilient storage module 104 and the disk interface 204 of the computer system 102. The storage connector 210 is for connecting a storage device to the computer system 102. For example, the storage connector 210 can be a SATA connector, a PATA connector, a SCSI connector, and IDE connector, a USB connector, a SAS connector, or other similar connector device. Similarly, the storage cable can be a SATA cable, a PATA cable, an IDE cable, a SCSI cable, a SAS cable, or other similar cable.

The storage interface 212 is a storage protocol controller. For example, the storage interface 212 can be a SATA controller, a PATA controller, a USB controller, a SCSI controller, an IDE controller, a SAS controller, or other similar storage device controller. The storage interface 212 allows the primary device 110 and the secondary device 112 to interface with the computer system 102 as a particular type of disk drive.

The multiplexer unit 214 can control the addressing of the primary device 110 and the secondary device 112. For example, the multiplexer unit 214 can switch the position of the non-volatile memory unit 108 to make the secondary device 112 the first bootable device.

The resilient storage module 104 can include the clock unit 216. The clock unit 216 is a clock device for measuring time. The clock unit 216 can be used to measure the time between events. For example, the clock unit 216 can be an oscillator, a crystal timing circuit, phase locked loop circuit, or other timing device.

The resilient storage module 104 can include the power unit 218. The power unit 218 can be used to operate the resilient storage module 104 when the electrical power from the computer system 102 is not available. The power unit 218 can have a variety of configurations. For example, the power unit 218 can be an ultra-capacitor, a battery, a super capacitor, or other power source.

The power unit 218 can have a variety of power configurations. The power unit 218 can be charged using the main power from the computer system 102 during regular operation. The power unit 218 can be sized to provide sufficient electrical power to the resilient storage module 104 for a pre-determined period of time. The pre-determined period can be sufficient for the resilient storage module 104 to detect a reboot condition, update the boot configuration of the primary device 110 and the secondary device 112, and initiate a reboot of the computer system 102.

The resilient storage module 104 can be coupled to the computer system 102 with the memory bus 208. The memory bus 208 can include a plurality of signal lines for transferring data, control, and status information.

The memory bus 208 can have a variety of configuration. For example, the memory bus 208 can include a clock enable line 222 (CKE line). The clock enable line 222 can be in a low state condition to indicate that an external clock has stopped and that commands should be transferred over the memory bus 208. The low state condition can indicate a low voltage, signal level, or logical values. When the clock enable line 222 is at a low state condition, the computer system 102 can be in a hung or non-operational state and may require a reboot. The clock enable line 222 can indicate a hung or non-operational state in on the order of hundreds of milliseconds.

The memory bus 208 can include one or more reserved future use lines 224 (RFU lines). The RFU lines 224 are unused lines and pins on the memory bus connector that can be repurposed. For example, the RFU lines 224 can be used to provide the memory bus 208 with connectivity between the disk interface 204 and storage interface 212 by replacing the storage cable 220. This can provide direct SATA connectivity to the primary device 110 and the secondary device 112.

The memory bus 208 can include a master reset line 226. The master reset line 226 can be coupled to the master reboot of the computer system 102. Triggering the master reset line 226 can cause the computer system 102 to initiate a reboot.

The resilient storage module 104 can have a variety of configurations. For example, the resilient storage module 104 can include a mezzanine card (not shown) for providing one or more of the non-volatile memory unit 108 to increase the capacity of the system.

The computer system 102 can include logic and control signals to transfer information. For example, the computer system 102 can include a master reset 230, a reset pin 232, and a status driver 234. The master reset 230 is a control line that can reboot the computer system 102. The reset pin 232 is a conductive element. The reset pin 232 can trigger the reset of the computer system 102. The status driver 234 is a program to monitor the status of the computer system 102.

It has been discovered that configuring the resilient storage module 104 with both the non-volatile memory unit 108 and the volatile memory unit 114 improves the technology efficiency of the computer system 102 by reducing the component count and reducing the physical size of the computer system 102. Because the non-volatile memory unit 108 having the primary device 110 and the secondary device 112 provides the boot device 116, the physical profile of the computer system 102 is reduced and enables to use of new more compact form factors.

It has been discovered that configuring the resilient storage module 104 to use the RFU lines 224 of the memory bus 208 to provide mass storage connectivity between the disk interface 204 and the storage interface 212 improves system performance and simplifies manufacturing of the computer system 102 by eliminating the need for the storage cable 220. Providing mass storage by plugging the resilient storage module 104 into the slot of the memory bus 208 reduces the number of steps required for assembling a full functional system.

It has been discovered that providing the clock unit 216 directly on the resilient storage module 104 improves performance and functionality by enabling the on-board time-out detection of the failure condition. The memory module controller 106 detects a time-out condition by locally checking the clock unit 216.

Figure 3:
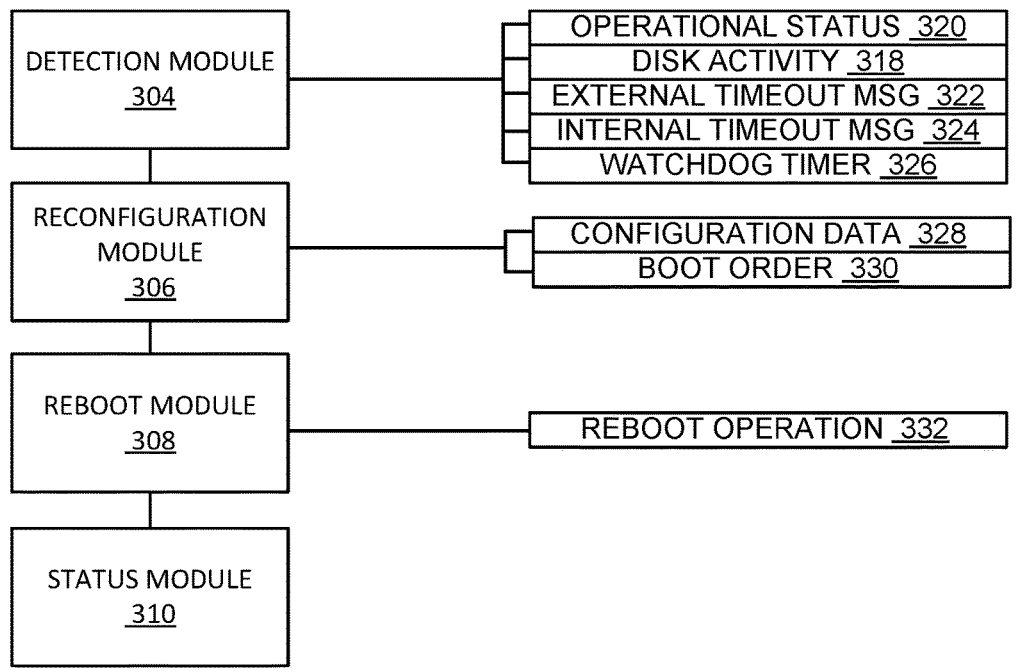
FIG. 3 is an example of the reboot process flow.

Referring now to FIG. 3, therein is shown an example of a reboot process flow 302. The reboot process flow 302 can detect an operational status 320, reconfigure the resilient storage module 104 of FIG. 1, and trigger a reboot in the computer system 102.

The reboot process flow 302 can reconfigure the resilient storage module 104 to change the boot configuration of the primary device 110 of FIG. 1 and the secondary device 112 of FIG. 1. The reboot process flow 302 can include a detection module 304, a reconfiguration module 306, a reboot module 308, and a status module 310.

The modules can be implemented using hardware, software, or a combination thereof. For example, the modules can be implemented by executing stored software (not shown) on the memory module controller 106 of FIG. 1. Alternatively, the modules can be implemented using electronic circuitry. The modules can also be implemented using hardware in combination with software running on the memory module controller 106.

The detection module 304 can detect when the computer system 102 of FIG. 1 is in a hung or non-operational state by detecting the operational status 320 of the computer system 102. This can occur when the system has failed a reboot operation 332, entered a failure condition during regular operation, encountered a system failure, encountered a failure in the operation of the primary device 110, or other similar problems. The operational status 320 can indicate whether the computer system 102 is in an operational or non-operational status 320.

The detection module 304 can detect the hung or non-operational state in a variety of ways. For example, the detection module 304 can monitor the clock enable line 222 of FIG. 2, from the motherboard of the computer system 102 and recognize the condition of the clock enable line 222 that indicates that the computer system 102 is hung or non-operational. The clock enable line 222 can express a low condition, such as when the voltage level of the clock enable line 222 is in a low voltage state, to indicate that the computer system 102 is non-operational. Similarly, the detection module 304 can detect the non-operational state when the clock enable line 222 expresses an incorrect signal pattern.

In another example, the detection module 304 can detect the hung or non-operational state by tracking a disk activity 318 of the storage devices of the computer system 102. The disk activity 318 is a value that indicates when the storage devices are in use. If there is no activity on the storage devices for an extended period of time, such as tens of seconds, then the computer system 102 can be in a non-operational state.

In yet another example, the detection module 304 can receive an external timeout message 322 from a watchdog timer 326 running on the computer system 102. The watchdog timer 326 can be hardware, software, or a combination thereof. The watchdog timer 326 can be automatically reset during regular operation. If the computer system 102 enters a non-operational state, then the watchdog timer 326 can exceed the automatic reset period and send the external timeout message 322 the resilient storage module 104 to indicate that the computer system 102 is in a non-operational state.

In still another example, the detection module 304 can receive an internal timeout message 324 from the clock unit 216 of FIG. 2 of the resilient storage module 104. The clock unit 216 can be configured by the memory module controller 106 to be used to check the amount of the disk activity 318 through the storage interface 212 of FIG. 2 to detect when the computer system 102 is in a non-operational state. Detecting a non-operational state using the disk activity 318 can be performed by comparing the amount of time since the last instance of the disk activity 310 to a disk activity threshold value and may require tens of seconds.

In another example, the detection module 304 can receive a message from the CPU 202 indicating the state of the CPU 202. If the state of the CPU 202 indicates a fault condition has occurred, then the resilient storage module 104 may initiate recovery. The state of the CPU 202 information may be in the form of ACPI (Advanced Configuration and Power Interface) signals or other CPU status information.

The detection module 304 can continuously check the state of the computer system 102 until a non-operational state is detected. After the non-operational state is detected, the control flow can pass to the reconfiguration module 306.

The reconfiguration module 306 can change the configuration of the boot device 116 of FIG. 1 of the resilient storage module 104 and switch the boot device 116 from the primary device 110 to the secondary device 112. The boot device 116 can be switched to recover from a condition where the primary device 110 cannot successfully boot the computer system 102 because of a problem with the primary device 110. Because the primary device 110 can be an operational mass storage device for the computer system 102, the primary device 110 can experience wear in the non-volatile memory over an extended period of time. If the primary device 110 experiences a failure, the secondary device 112 can be configured as the boot device 116.

In another example, the reconfiguration module 306 can change the configuration of the boot device 116 by altering the settings of the multiplexer unit 214 of FIG. 2 to change the address lines to swap a boot order 330 of the primary device 110 and the secondary device 112. The boot order 330 indicates the order in which the storage devices are used to boot the computer system 102. The multiplexer unit 214 can be set such that the device address of the primary device 110 points to the old device address of the secondary device 112 and the device address of the secondary device 112 points to the old device address of the primary device 110. The secondary device 112 can have the device address of the boot device 116 and will be used to reboot the computer system 102.

In yet another example, the reconfiguration module 306 can change the configuration of the boot device 116 dynamically by configuring the storage interface 212 to swap the position of the default boot device. The memory module controller 106 can configure the storage interface 212 to change the position of the boot device 116.

In an illustrative, the memory module controller 106 can change the configuration of the boot device 116 using any of the above techniques after receiving a command over an inter-Integrated Circuit bus (I2C). The memory module controller 106 can communicate with a non-volatile controller, such as a Flash controller, associated with the non-volatile memory unit 108 of FIG. 1. The I2C bus (not shown) can provide communication of information for the resilient storage module 104.

The reconfiguration module 306 can store configuration data 328 describing the boot configuration of the primary device 110 and the secondary device 112. The configuration data 328 can be stored in the non-volatile memory unit 108 in a variety of locations. The configuration data 328 can be stored in a configuration storage area, in a file in the primary device 110, in a file in the secondary device 112, in a file in an unallocated portion of the non-volatile memory unit 108, or a combination thereof. The memory module controller 106 can write the configuration data 328 in the non-volatile memory unit 108.

The reconfiguration module 306 can reconfigure the resilient storage module 104 while being powered by the power unit 218 of FIG. 2 even if the main power of the computer system 102 is unavailable during the reboot process. The power unit 218, such as an ultra-capacitor, battery, or other energy storage device, can be continuously recharged using the main power of the computer system 102 and be used to power the resilient storage module 104 when the computer system 102 is rebooting. The resilient storage module 104 can include circuitry to detect the loss of power from the computer system 102 and automatically switch to using the power from the power unit 218.

Although the non-volatile memory unit 108 has been described as having two storage devices, it is understood that the non-volatile memory unit 108 can have different configurations. The non-volatile memory unit 108 can support any number of storage devices with each capable of being the boot device 116.

The reconfiguration module 306 can update the boot configuration of the resilient storage module 104. After the boot configuration of the primary device 110 and the secondary device 112 has been updated, the control flow can pass to the reboot module 308.

The reboot module 308 can trigger the reboot operation 332 in the computer system 102. The reboot operation 332 can cause the computer system 102 to load and execute the first boot image 120 of FIG. 1 into the main memory. The reboot module 308 can trigger the reboot operation 332 from the resilient storage module 104.

The reboot module 308 can trigger the reboot operation 332 in a variety of ways. For example, the reboot module 308 can trigger the master reset 230 of FIG. 2 of the computer system 102. Triggering the master reset 230 can cause the computer system 102 to reboot. The master reset 230 is the hardware configured to reboot the computer system 102.

The reboot module 308 can trigger the master reset 230 using a cable connected from the resilient storage module 104 to the reset pin 232 of FIG. 2 on the motherboard of the computer system 102. Alternatively, the computer system 102 can be configured to use one of the RFU lines 224 of FIG. 2 of the memory bus 208 to trigger the reset. In another option, the resilient storage module 104 and the computer system 102 can be configured to reboot the computer system 102 when the clock enable line 222, such as the CKE line, is used to send a message to the computer system 102. In yet another option, the computer system 102 can be configured to detect a particular message or pattern on the memory bus 208 and use the message to trigger the reset.

The reboot module 308 can trigger the reboot operation 332 by manipulating the power lines connected to the memory bus 208. The reboot module 308 can reboot the computer system 102 by forming a short between the power pins of the memory bus 208 of FIG. 2. The reboot module 308 can initiate a reboot by providing an output signal to the computer power supply causing the power supply to cycle power for the computer. After triggering the reboot operation 332, the control flow can pass to the status module 310.

The status module 310 can check to see if the computer system 102 has successfully initiated the reboot process. The status module 310 can check the operational status 320 of the computer system 102 in a variety of ways.

For example, the status module 310 can detect the state of the clock enable line 222, such as the CKE line, to determine if the computer system 102 is in an operational state. In another example, the status module 310 can detect the status of the computer system 102 by sending and receiving a message via the status driver 234 of FIG. 2 running in the computer sy stem 102.

If the status module 310 determines that the operational status 320 of the computer system 102 is non-operational, then the control flow can pass back to the reconfiguration module 306. If the status module 310 determines that the operational status 320 is operational, then the control flow can pass back to the detection module 304 to continue monitoring for future problems.

It has been discovered that configuring the resilient storage module 104 with the reconfiguration module 306 improves the performance and reliability of the technology of the computer system 102 by allowing the computer system 102 to reboot even after experiencing a component failure in the primary device 110. Because the reconfiguration module 306 changes the boot device 116 of the non-volatile memory unit 108 to make the secondary device 112 the boot device 116, the computer system 102 can continue operating even in a deprecated state.

Figure 4:
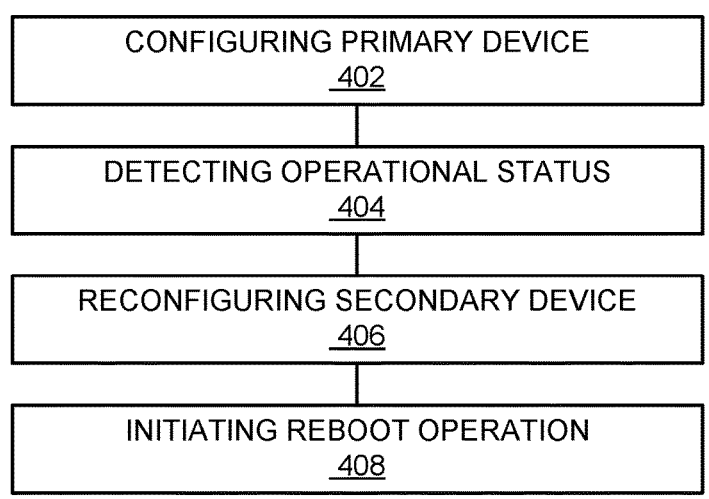
FIG. 4 is a flow chart of a method of operation of a memory management system in a further embodiment of the present invention.

Referring now to FIG. 4, therein is shown a flow chart of a method 400 of operation of a memory management system in a further embodiment of the present invention. The method includes: configuring a primary device of a resilient storage module as a boot device for booting a computer system in a block 402; detecting an operational status of the computer system in a block 404; reconfiguring a secondary device of the resilient storage module as the boot device based on the operational status indicating a non-operational state in a block 406; and initiating a reboot operation using the secondary device as the boot device for the computer system in a block 408.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a memory management system comprising:
   configuring a primary device of a resilient storage module as a boot device for booting a computer system, the resilient storage module resident in a dual-inline memory module (DIMM) package;
   detecting an operational status of the computer system from the resilient storage module;
   switching the resilient storage module from main power from the computer system to a stored power unit on the resilient storage module in response to the operational status indicating a non-operational state of the computer system, the stored power unit sized to provide sufficient electrical power to detect the non-operational state of the computer system, update a boot configuration of the primary device and a secondary device, and initiate a reboot operation for the computer system;
   reconfiguring the secondary device of the resilient storage module as the boot device in response to the operational status indicating the non-operational state; and
   initiating the reboot operation using the secondary device as the boot device for the computer system.

2. The method as claimed in claim 1 wherein detecting the operational status includes detecting the operational status by monitoring a clock enable line for a low state condition.

3. The method as claimed in claim 1 wherein detecting the operational status includes detecting the operational status by measuring a disk activity of the primary device.

4. The method as claimed in claim 1 wherein detecting the operational status includes detecting the operational status by receiving an internal timeout message based on a clock unit of the resilient storage module.

5. The method as claimed in claim 1 wherein reconfiguring the boot device includes configuring the secondary device with the second boot image.

6. A method of operation of a memory management system comprising:
   configuring a primary device of a resilient storage module as a boot device for booting a computer system, the resilient storage module resident in a dual-inline memory module (DIMM) package;
   loading a first boot image of the primary device into a volatile memory unit of the resilient storage module;
   detecting an operational status of the computer system from the resilient storage module;
   switching the resilient storage module from main power from the computer system to a stored power unit on the resilient storage module in response to the operational status indicating a non-operational state of the computer system, the stored power unit sized to provide sufficient electrical power to detect the non-operational state of the computer system, update a boot configuration of the primary device and a secondary device, and initiate a reboot operation for the computer system;
   reconfiguring the secondary device of the resilient storage module as the boot device in response to the operational status indicating the non-operational state; and
   initiating the reboot operation using the secondary device as the boot device for the computer system.

7. The method as claimed in claim 6 wherein detecting the operational status includes detecting the operational status by receiving an external timeout message based on a watchdog timer of the computer system.

8. The method as claimed in claim 6 wherein reconfiguring the boot device includes configuring a multiplexer unit to switch the boot order of the primary device and the secondary device.

9. The method as claimed in claim 6 wherein reconfiguring the boot device includes configuring the secondary device with the second boot image.

10. The system as claimed in claim 6 wherein initiating the reboot operation includes triggering a master reset line.

11. A memory management system comprising:
    a primary device of a resilient storage module configured as a boot device for booting a computer system, the resilient storage module resident in a dual-inline memory module (DIMM) package;
    a stored power unit on the resilient storage module for operating the resilient storage module;
    a secondary device of the resilient storage module configured as the boot device in response to an operational status of the computer system indicating a non-operational state; and
    a memory module controller of the resilient storage module for detecting the operational status of the computer system, switching the resilient storage module from main power to the stored power in response to the operational status indicating the non-operational state of the computer system unit, and for initiating a reboot operation using the secondary device as the boot device, the stored power unit sized to provide sufficient electrical power to detect the non-operational state of the computer system, update a boot configuration of the primary device and the secondary device, and initiate the reboot operation for the computer system.

12. The system as claimed in claim 11 wherein the operational status is detected by monitoring a clock enable line for a low state condition.

13. The system as claimed in claim 11 wherein the operational status is detected by measuring a disk activity of the primary device.

14. The system as claimed in claim 11 wherein the operational status is detected by receiving an internal timeout message based on a clock unit of the resilient storage module.

15. The system as claimed in claim 11 wherein the boot device is the secondary device with the second boot image.

16. The system as claimed in claim 11
a first boot image in the primary device for loading into a volatile memory unit of the resilient storage module.

17. The system as claimed in claim 16 wherein the operational status is detected by receiving an external timeout message based on a watchdog timer of the computer system.

18. The system as claimed in claim 16 wherein the boot device is selected with a multiplexer unit switching the boot order of the primary device and the secondary device.

19. The system as claimed in claim 16 wherein the boot device is the secondary device with the second boot image.

20. The system as claimed in claim 16 further comprising a master reset line for triggering the reboot operation of the computer system.

* * * * *